Dec. 15, 1953  R. S. HERTZLER  2,662,414
HARVESTING MACHINE
Filed Dec. 28, 1946  6 Sheets-Sheet 6
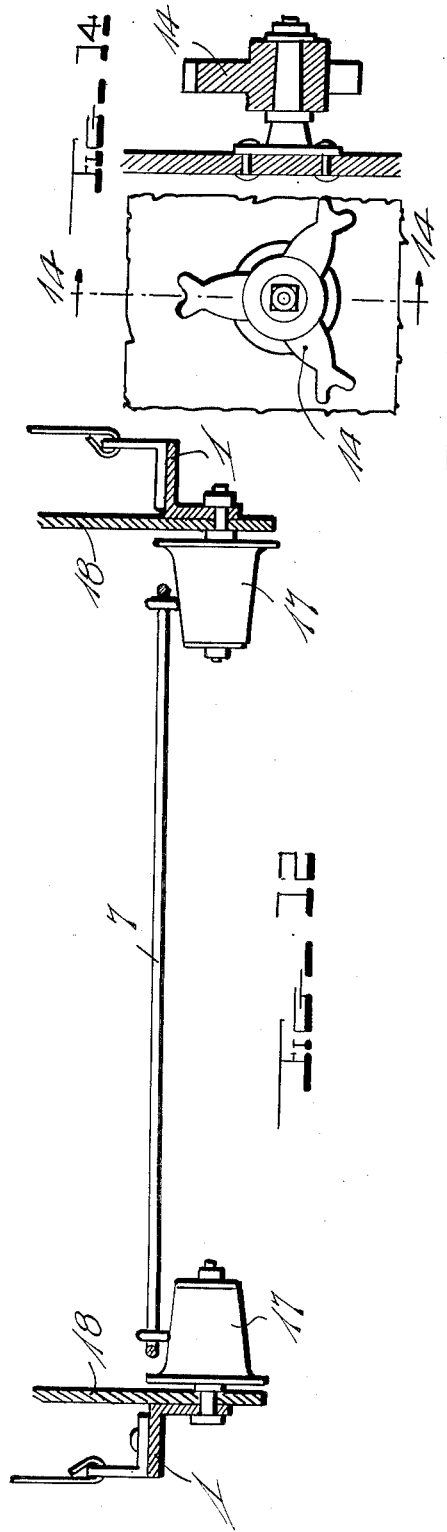
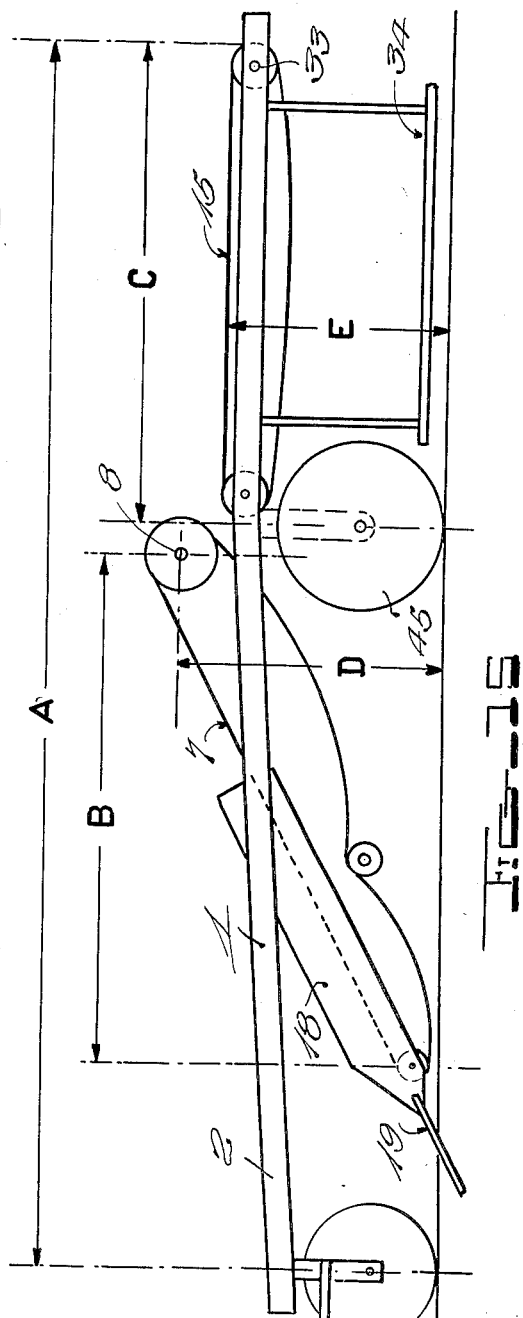
INVENTOR
Ralph S. Hertzler,
By John B. Brady
ATTORNEY

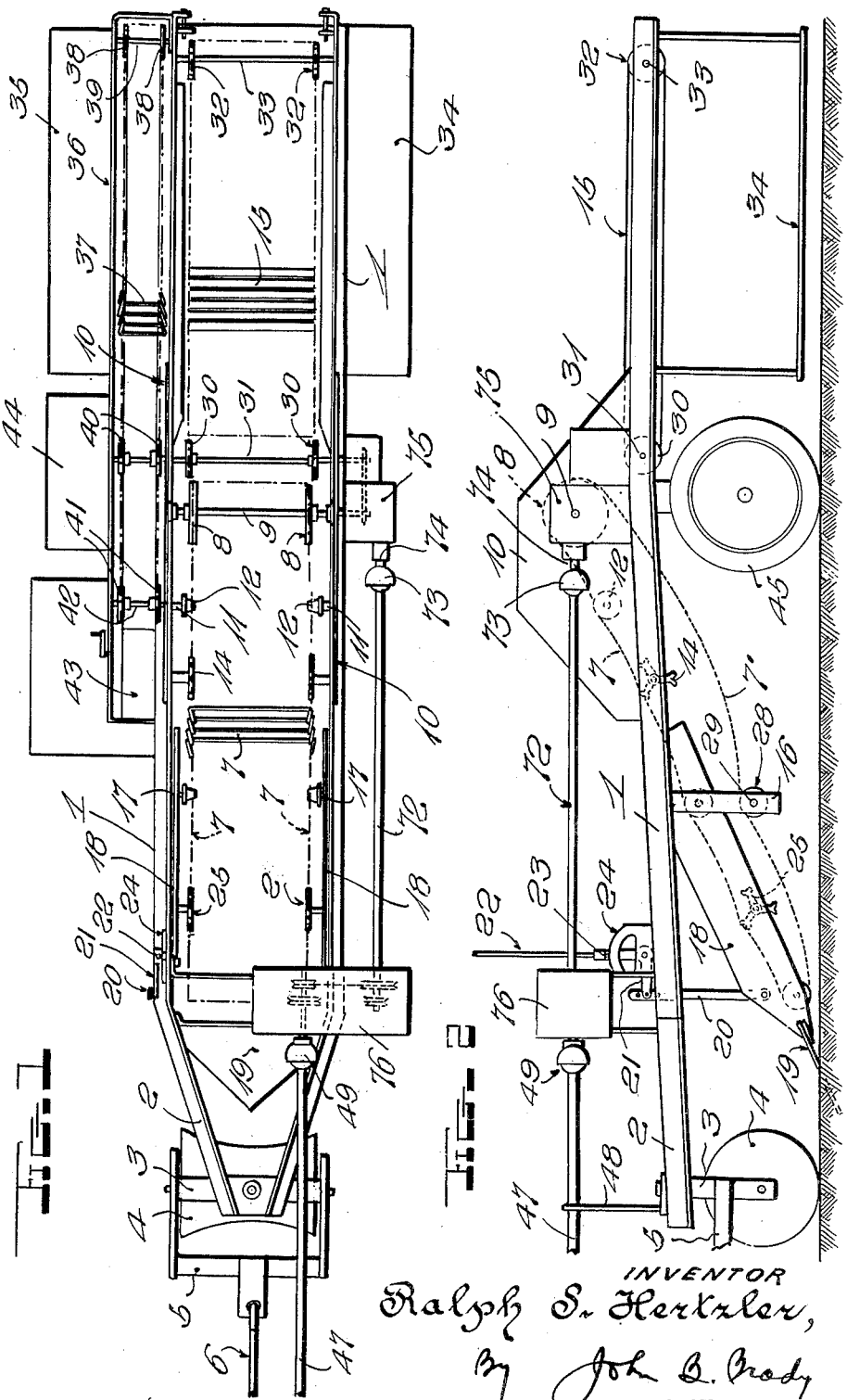

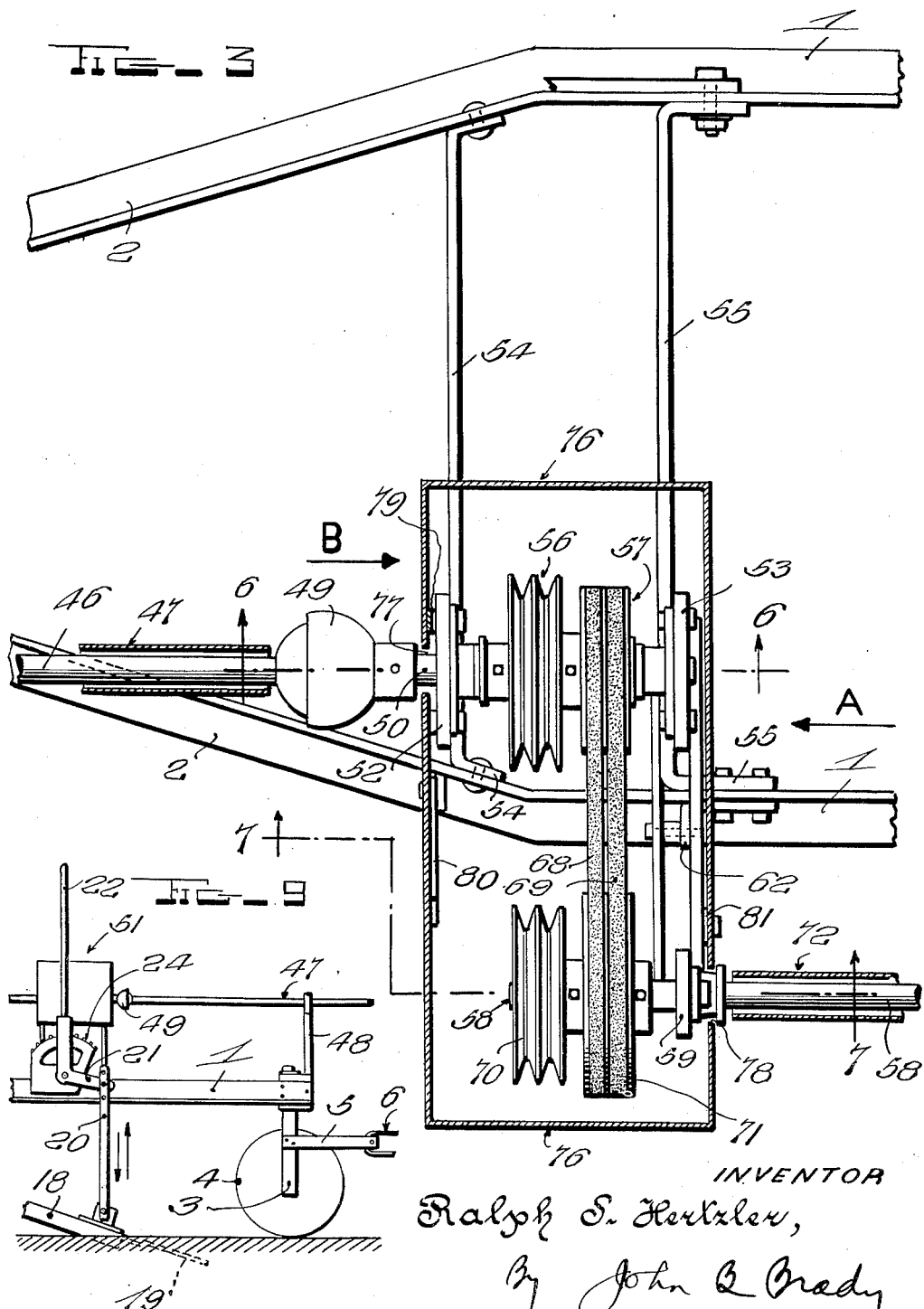

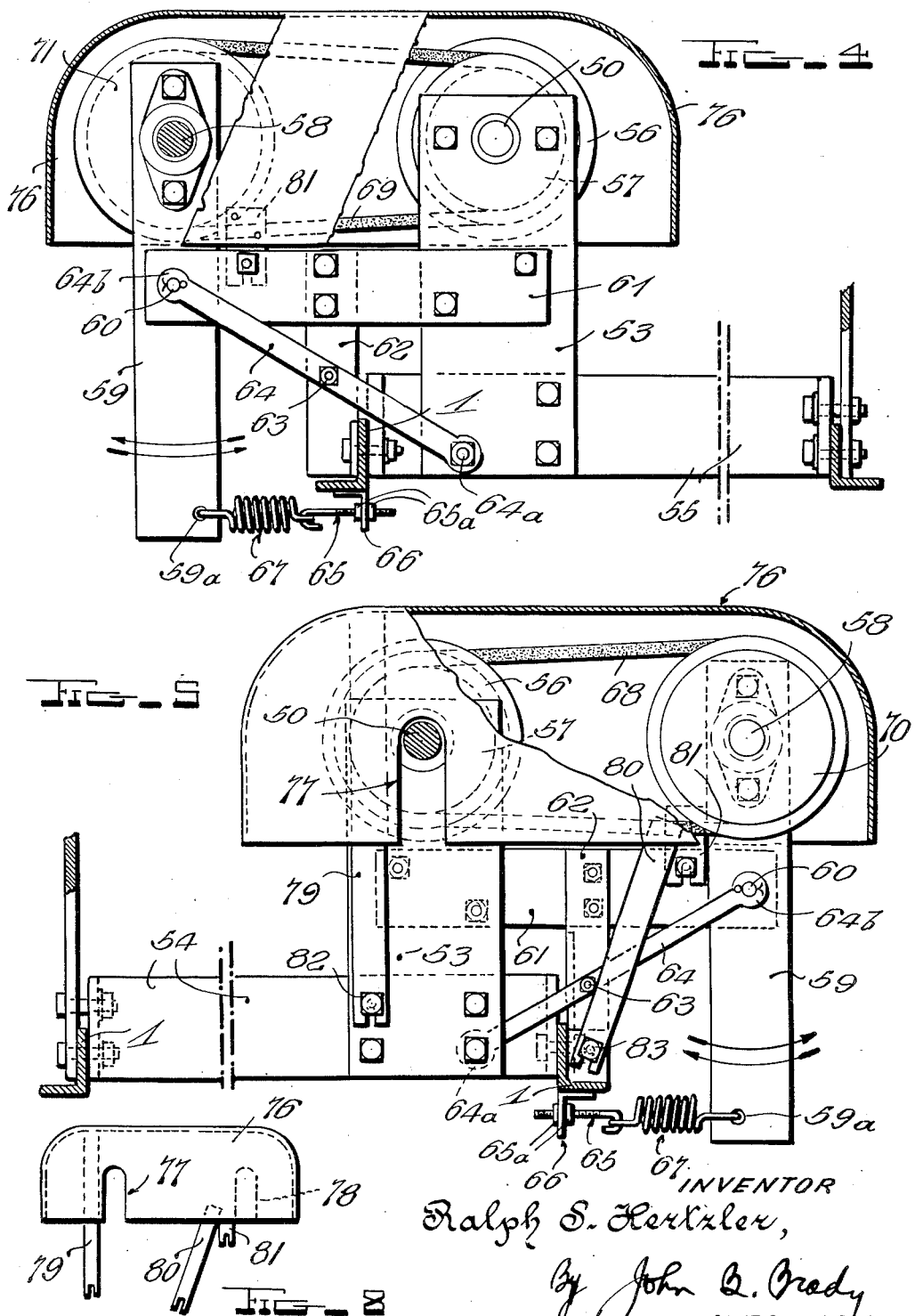

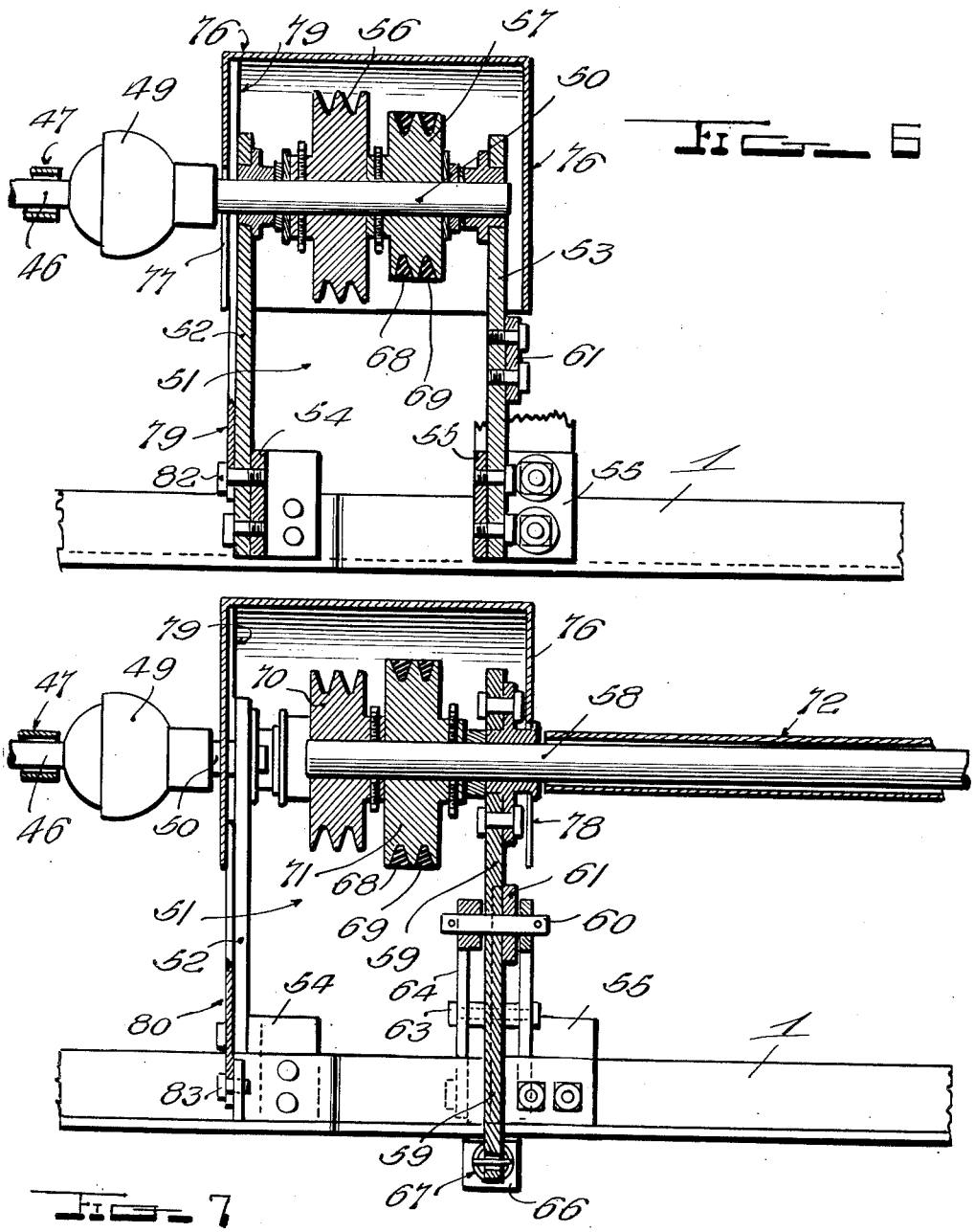

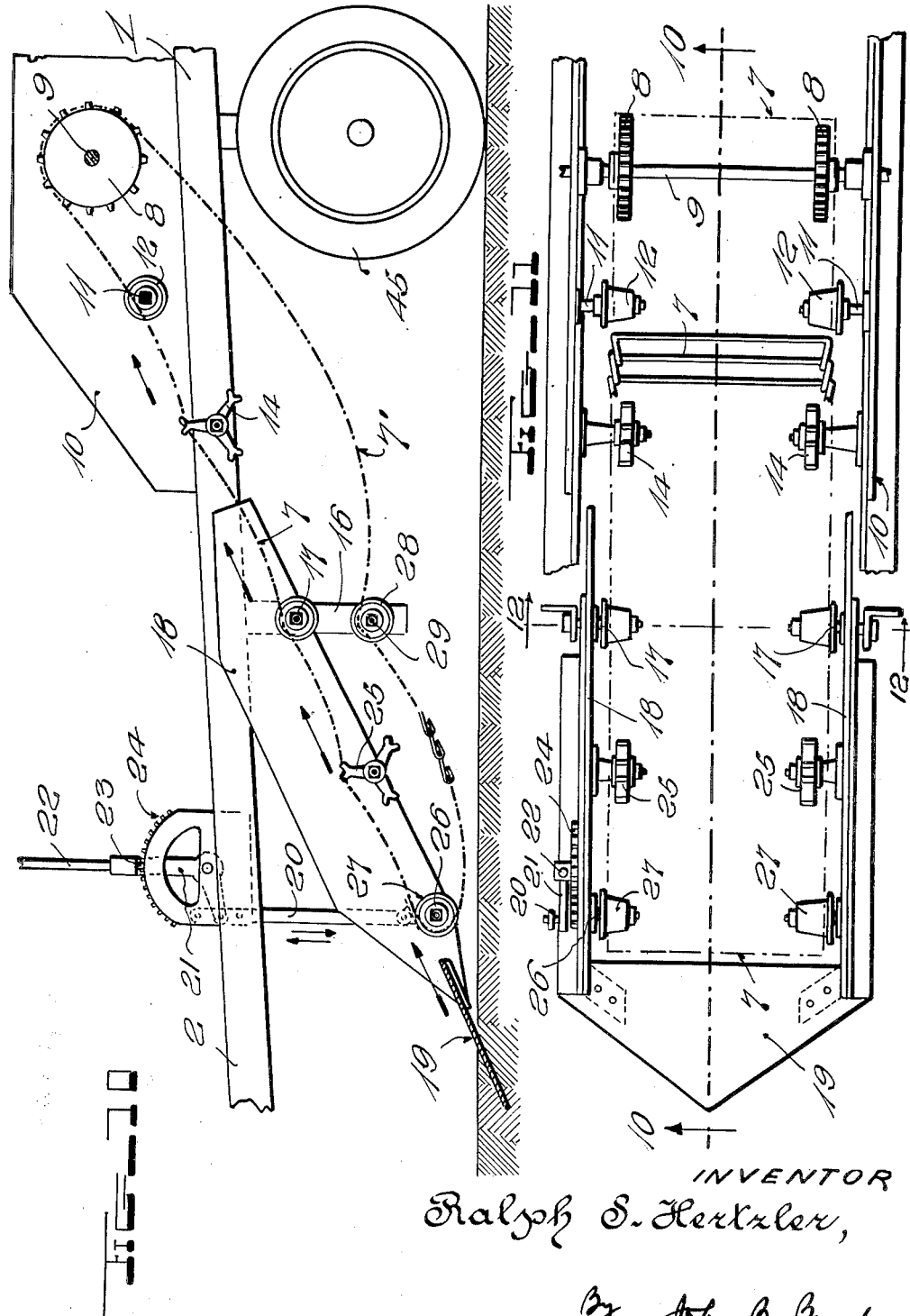

Patented Dec. 15, 1953

2,662,414

UNITED STATES PATENT OFFICE 2,662,414

HARVESTING MACHINE

Ralph S. Hertzler, Elverson, Pa.

Application December 28, 1946, Serial No. 718,995

10 Claims. (Cl. 74—217)

1

My invention relates broadly to harvesting machines and more particularly to an improved construction of harvester for potatoes and other tuber-like or bulbular vegetables.

One of the objects of my invention is to provide a construction of harvester for potatoes and other tuber-like or bulbular vegetables having means for accurately controlling the operating functions of the different parts of the harvester to insure the digging, picking and delivery of potatoes with maximum efficiency.

Another object of my invention is to provide a construction of harvester for potatoes and other tuber-like or bulbular vegetables having variable speed control means located between the tractor drive and the various moving parts of the harvester for adjusting the speeds of the moving parts in proportion to the linear speed of the harvester and the character of the crop.

Still another object of my invention is to provide an improved construction of mounting means for the variable speed mechanism and associated parts thereof for a harvesting machine for harvesting potatoes and other tuber-like or bulbular vegetables.

Still another object of my invention is to provide an improved construction of castor front end support for harvesters for effectively guiding the harvester over the field to be harvested while facilitating the transmission of power from the tractor to the harvester.

Other and further objects of my invention reside in the relative proportions and dimensions of parts of the harvesting machine and the relative speed thereof as set forth more fully in the specification hereinafter following by reference to the accompanying drawings in which:

Figure 1 is a top plan view of the harvester of my invention; Fig. 2 is a side elevational view of the harvester illustrated in Fig. 1; Fig. 3 is a fragmentary top plan view of the variable speed mechanism for transmitting power from the tractor to the harvester with certain of the parts broken away and illustrated in section; Fig. 4 is an elevational view looking toward the variable speed mechanism in the direction of arrow A in Fig. 3 with certain of the parts broken away and illustrated in section; Fig. 5 is an elevational view of the variable speed mechanism looking in the direction of arrow B in Fig. 3 with certain of the parts broken away and illustrated in section; Fig. 6 is a vertical sectional view through the variable speed mechanism taken substantially on line 6—6 of Fig. 3; Fig. 7 is a vertical sectional view taken substantially on line 7—7 of Fig. 3; Fig. 8 is a side elevational view of the removable protective cover employed on the variable speed mechanism mounted adjacent the front of the harvester; Fig. 9 is a fragmentary view illustrating the manner of adjusting the plow adjacent the front of the harvester; Fig. 10 is a fragmentary view taken substantially on line 10—10 of Fig. 11 illustrating the arrangement of elevating conveyor and plow adjusting mechanism employed in the harvester; Fig. 11 is a plan view of the forward end of the harvester as illustrated in Fig. 10 and showing the plow and the supports carried by the frame of the harvester for the elevating conveyor; Fig. 12 is a transverse sectional view taken through the forward end of the harvester substantially on line 12—12 of Fig. 11; Fig. 13 is a fragmentary end view of one of the supports for the elevating conveyor including the shaker mechanism associated therewith looking in the direction of arrow C in Fig. 11; Fig. 14 is a vertical sectional view taken substantially on line 14—14 of Fig. 13; and Fig. 15 is a view illustrating the relative proportions and dimensions of the operating parts of the harvester.

In the harvesting of crops such as potatoes, tuber-like or other bulbular vegetables I have found that it is highly important to time the elevating conveyor and picker table conveyor of the harvester with the linear speed of the harvester as drawn by a tractor according to the character of the crop. Under conditions of heavy crops the speed of movement of the conveyors must be reduced and the relative speeds thereof modified, while with the run of light crops the relative speeds of the picker table and elevating conveyor must be changed and the linear speed of the harvester increased in order to most efficiently employ the time of the operatives who run with the harvester and pick the vegetables from the picker table conveyor. I accordingly interpose between the tractor drive and the operating parts of the harvester variable speed mechanism by which the several functions of the harvester may be controlled. I so proportion the lengths of the elevating conveyor and the picker table conveyor with reference to the heights thereof above the terrain and with reference to the linear speed of the harvester when the operatives picking at a relatively uniform rate may accomplish a maximum amount of work with minimum effort and gather the harvest within a minimum of time.

Figure 1 of the drawings shows the harvester in plan view where the chassis is represented by reference character 1 constructed from an angle iron frame tapered at the front thereof as represented at 2, and pivotally mounted upon the yoke 3 in which the roller 4 is journalled. The yoke 3 is connected to drawbar 5 which provides means for connection to the pulling tractor through link 6. The chassis 1 provides a support adjacent the front portion of the machine for the elevating conveyor which I have represented at 7. The elevating conveyor has the upper end thereof supported over sprocket wheels 8 carried by shaft 9 which is journalled in bearings carried by side plates 10 secured to chassis 1. The side plates 10 also provide journalling means for stub shafts 11 which project inwardly therefrom and support rollers 12 over which the elevating conveyor 7 operates. The chassis 1 also provides journalling means for inwardly directed agitator members 14 which engage the links of the elevating conveyor 7 and effect vibration thereof as the elevator conveyor operates for freeing the conveyor of stones, lumps and obstructions while enabling the vegetables to be carried upwardly to the picker table conveyor represented at 15.

The chassis 1 has a pair of depending bracket members 16 extending downwardly at each side thereof which serve as journalling means for stub shafts 17 and pivotal mounting means for the side plates 18. The side plates 18 constitute a substantially U-shaped frame which terminates at its lower end in the plow point 19. The side plates 18 are disposed within the confines of the frame members 1 constituting the chassis and constitute a frame which is capable of being adjusted upwardly or downwardly by means of the pivotally connected link 20 which is adjustably connected through crank lever 21 with the manually controllable lever arm 22. The lever arm 22 has a detent 23 thereon operative to selectively engage with the teeth of the segmental rack 24 for adjusting the plowing depth of the plow 19. Adjustable apertures in the end of link 20 permit the link to be selectively connected at the desired position with the crank 21.

The side plates 18 constituting the U-shaped frame connected to the plow point 19 include vibratory or rocker members 25 journalled thereon and inwardly directed therefrom for engaging the transverse links of the elevating conveyor 7 in a manner similar to the agitator members 14. Plate members 18 also carry adjacent the lower extremity thereof stub shafts 26 on which roller members 27 are journalled which serve as the guide means for the lower extremity of the elevating conveyor 7. The catenary formed by the lower portion of the endless chain conveyor 7 is represented at 7'. Excessive slack in the return path of the conveyor 7 is supported by roller members 28 journalled on stub shafts 29 carried by the depending bracket 16. Thus the upper portion of the elevator conveyor is relatively fixed between side plates 10 whereas the lower portion of the elevator conveyor is relatively adjustable by movement of the frame constituted by side plates 18 according to the plowing depth which is desired.

The picker table conveyor shown at 15 is arranged adjacent the rear of the chassis 1 and is supported by sprocket wheels 30 carried by shaft 31 journalled in chassis 1 and sprocket wheels 32 carried by shaft 33 journalled in chassis 1. The picker table conveyor operates to move the vegetables delivered by the upper end of the elevating conveyor progressively by the operatives who stand upon platforms 34 and 35 suspended from chassis 1. Intermediately platform 35 and picker table conveyor 15 I provide a bagging conveyor frame 36 within which the sacking conveyor 37 operates. The sacking conveyor 37 operates over sprocket wheels 38 carried by shaft 39 and sprocket wheels 40 carried by an extension of shaft 31 and by sprocket wheels 41 carried by shaft 42. The shaft 31 serves to drive both the picker table conveyor 15 in a direction toward the rear of the harvester and the sacking conveyor 37 in a direction toward the front of the harvester for delivery to bags at the position 43. An auxiliary platform 44 is provided for facilitating movement of the operatives to different parts of the harvester in supervising the control thereof. The chassis 1 carrying the several parts of the harvester is mounted on the wheeled support represented at 45 by which the chassis 1 is drawn over the field by a tractor.

The power for operating the elevating conveyor 7, the picker table conveyor 15 and the sacking conveyor 37 is obtained from the tractor which pulls the harvester. For this purpose a driven shaft 46 extends from the tractor rearwardly to the harvester protected by a shaft housing 47 within which the driven shaft 46 operates. The housing 47 is supported by a suitable standard 48 mounted adjacent the front portion 2 of the chassis 1. Shaft 46 terminates in a universal rotatable coupling 49 which imparts rotation to shaft 50 journalled in the variable speed transmission unit represented at 51. Shaft 50 is journalled in vertically extending supports 52 and 53 mounted on transversely extending members 54 and 55 on chassis 1. The shaft 50 carries a set of V belt pulleys of different diameters represented at 56 and 57. A countershaft 58 is arranged in spaced parallel relation to driven shaft 50 and is journalled in the pivotally mounted standard 59. The standard 59 is supported for angular adjustment by pin member 60 which extends through the standard 59 and through the transverse bar 61 which is supported on standard 53 and braced by vertically disposed intermediate member 62. The intermediate member 62 is disposed intermediate the standards 53 and 54 and is secured to chassis 1 by appropriate bracket means and serves as an intermediate support at 63 for the angularly extending link 64. Transverse bar 61 and intermediate member 62 constitute a transverse frame. Link 64 connects at one end 64a with standard 53 and tranvserse member 55 and at the other end 64b with the pin member 60. Link 64 serves as a brace for supporting standard 59 in a position in which the standard may be adjusted about pin 60 as a center.

The adjustment of standard 59 is effected by means of the screw-threaded adjustment hook 65 which is screw-threaded into angle member 66 depending from chassis 1. The hook 65 is advanced or retracted transversely of the chassis by rotating the screw-threaded hook through a screw-threaded aperture in angle member 66 and locking the hook in adjusted position by means of lock nuts 65a. A spring 67 is interposed between screw-threaded hook 65 and the aperture 59a in standard 59. By virtue of the resilient mounting of counter-shaft 58 thus provided, it is possible to effect a quick change of position of the V belts 67 and 69 on the sets of V belt pulleys carried by driven shaft 50 and countershaft 58. Counter-shaft 58 carries two sets of V belt pulleys represented at 70 and 71 which are aligned with the V belt pulleys 56 and 57 on the driven shaft 50. The V belt pulleys 70 and 71 vary in diameter for the purpose of obtaining the required variation in drive speeds for the conveyors on the harvester independently of the driving rate delivered through shaft 46 or independently of the rate of movement of the tractor through the field. It will be observed that the large size V belt pulleys 56 on drive shaft 50 may be coupled with the smaller size V belt pulleys 70 on counter-shaft 58 or the smaller size V belt pulleys 57 on driven shaft 50 may be coupled with the larger size V belt pulleys 71 on counter-shaft 58.

Ordinarily a change in speeds is accomplished only with an elaborate and costly system of gears.

In the system of my invention, however, the ease with which the counter-shaft 58 may be shifted toward the driven shaft 50 to permit removal of the V belts 68 and 69 from one set of pulleys and the restoration of the V belts to another set of pulleys greatly increases the efficiency of operation of the harvester and enables the harvester to be used with maximum efficiency over a wide range of differing conditions encountered in harvesting in different geographical areas.

Counter-shaft 58 is enclosed in a protective shaft housing 72. The counter-shaft 58 and housing 72 terminate in a universal joint represented at 73 which connects to drive shaft 74 leading to a system of gears in housing 75 coupling transverse shafts 9 and 31 for driving the elevator conveyor 7, the picker table conveyor 15 and the sacking conveyor 37. The universal joint 73 permits the forward end of counter-shaft 58 to be sufficiently displaced by movement on standard 59 to insure interchange of the V belts 68 and 69 on the different size V belt pulleys.

I provide a protective hood 76 which is readily attachable to and removable from the speed change mechanism. The protective hood 76 is dimensioned to protectively embrace the sets of V belt pulleys 56 and 57 and 70 and 71 with the V belts 68 and 69 in position thereon as represented in Figs. 4–8. The protective hood 76 is provided with slots 77 and 78 in the side walls thereof to permit the hood to be passed over the driven shaft 50 and the counter-shaft 58. Projecting arms extend from the opposite walls of the hood as represented at 79, 80 and 81 and engage headed lugs 82, 83 and 84 respectively. These depending arms are arranged in different angular positions and are bifurcated at the ends thereof to engage the headed lugs which are so located with respect to the frame supports carried by chassis 1 that the protective hood 76 is resiliently maintained in position over the V belts ready to be quickly removed or restored when the change of speed must be effected.

The linear speed of the elevating conveyor 7 is driven at 1.80 times the speed at which the harvester is being towed when the tractor is running in low gear and 1.40 times the forward velocity when the tractor is operating in second gear. However, the adjustable V belt drive permits a variation of ±16% in these nominal ratios, so that with proper selection of tractor gears and V belt drive, this ratio can be varied infinitely from 1.17 to 2.12.

The linear velocity of the picker table is fixed at .388 times that of the digger elevator, and the velocity of the sacking elevator is .566 times that of the digger elevator.

For maximum efficiency in operation I have discovered that certain fundamental dimensions must be adhered to for the coordinated functioning of the parts of the harvester. I have indicated these dimensions by reference letters in Fig. 15 which I am listing as follows:

A—Over-all length of harvester 16'6"
B—Length of elevating conveyor 7'0"
C—Length of picker table conveyor 6'4"
D—Height of elevating conveyor to upper journal 3'7"
E—Height of picker table conveyor:
    Adjacent forward end of harvester 3'0½"
    Adjacent rear of harvester 3'7"

The picker table conveyor is inclined upwardly from a position adjacent the forward portion of the harvester to the rear of the harvester and the operatives work by standing on platforms 34 and 35 with maximum efficiency when the elevation of the picker table conveyor is as set forth above.

I have found the harvester of my invention very practical and successful in operation. The machine of my invention when used with a four-man crew has successfully accomplished the work of nineteen hand pickers in the same length of time when using the machine of my invention for harvesting potatoes. Inexperienced labor may be employed and workers enjoy riding on the harvester and picking potatoes as they do their work at waist level instead of picking from the ground with long hours of tiresome stooping and bending. The digger scoops up all of the soil, sifting the dirt, stones and weeds from the potatoes and, consequently, all of the potatoes on the vine are lifted to the picking table in plain sight. A potato crop can be harvested rapidly with maximum use of available personnel under conditions of labor shortages.

While I have described my invention in certain of its preferred embodiments I realize that modifications may be made and I desire that it be understood that no limitations upon my invention are intended other than may be imposed by the scope of the appended claims.

What I claim as new and desire to secure by Letters Patent of the United States is as follows:

1. A speed changer, comprising a chassis, a first standard, a second standard, means for mounting said first standard in fixed position on said chassis, means for mounting said second standard in pivoted relation to said first standard, a third standard supported on said chassis in longitudinal spaced alignment with said first standard, a driven shaft journaled between said first and third standards, a universal coupling connected with one end of said driven shaft for imparting rotation thereto, means for adjusting the position of said second standard with respect to said first standard about the pivot thereof, a countershaft journaled in said second standard, and operating to transmit a rotative driving force therefrom, groups of different sized coacting pulley members carried by both said driven shaft and said countershaft, a drive belt engageable and disengageable over said coacting pulley members as said second standard is adjusted toward said first standard for selectively changing the position of said belt on said pulleys and the corresponding ratio of speed between said driven shaft and said countershaft, said belt operating in planes substantially normal to the axes of said shafts.

2. A speed changer as set forth in claim 1 in which said first and second standards are mounted in coplanar relation and wherein said second standard is mounted in a position offset from one side of said chassis, and is displaceable about the pivotal mounting thereof toward the chassis.

3. A speed changer as set forth in claim 1 in which said first and second standards are interconnected by a bar disposed diagonally to the chassis, said bar being connected with said second standard at the pivotal mounting thereof, and being connected with said first standard at a position adjacent said chassis.

4. A speed changer comprising a substantially horizontally disposed chassis formed by longitudinally extending frame members, spaced transverse members connected between said longitudinally extending frame members, vertically extending aligned standards carried by said spaced transverse frame members, a driven shaft journaled in said vertically extending aligned standards, a vertically disposed standard carried by one of the longitudinally extending frame members of said chassis in substantially coplanar alignment with one of the vertically extending standards, a bar carried by said last mentioned standard and extending transversely of said chassis and pivotally connected with the vertically extending standard in substantially coplanar relation thereto and extending outwardly beyond said last mentioned longitudinally extending frame member of said chassis, said last mentioned standard being angularly displaceable vertically about the pivotal connection with said transverse bar and projecting both above and below said transverse bar, a countershaft journaled adjacent the upwardly projecting end of said displaceable standard, adjustable tension spring means extending between the lower end of said last mentioned standard and the last mentioned longitudinally extending frame member of said chassis for urging the upper end of said last mentioned standard in a direction outwardly from said chassis away from said driven shaft, groups of different sized coacting pulley members carried by spaced transversely aligned portions of said driven shaft and said countershaft, a drive belt selectively engageable over and disengageable from said transversely aligned pulley members, a gear system carried by said chassis intermediate the ends thereof and substantially spaced from said standards, and a driven shaft projecting forwardly from said gear system, and terminating in a universal joint, said countershaft extending rearwardly from said displaceable standard and connected with said universal joint whereby the forward end of said last mentioned driven shaft is adjustable toward or away from said first mentioned driven shaft as the drive belt is selectively engaged over pulleys of selected size for predetermining the speed of rotation imparted to said second mentioned driven shaft.

5. A belt drive speed change mechanism comprising in combination a longitudinally extending frame structure, a transverse frame carried by said longitudinally extending frame structure, a vertically extending standard connected with said transverse frame, a driven shaft journaled in said standard, a standard pivotally mounted in said transverse frame in spaced substantially coplanar relation to the aforesaid standard and extending both above and below said transverse frame, adjustable tension means connected between the lower extension of said pivotally mounted standard and said longitudinally extending frame structure, a gear system carried by said transverse frame structure, a countershaft journaled in said pivotally mounted standard, said gear system comprising groups of different sized transversely aligned pulleys carried by said driven shaft and said countershaft and a belt selectively engageable over and disengageable from said transversely aligned pulleys for driving said countershaft at a predetermined speed relative to said driven shaft.

6. A belt drive speed mechanism as set forth in claim 5 in which a substantially T-shaped frame is connected with said first mentioned vertically extending standard, with said driven shaft journaled in the said first mentioned vertically extending standard adjacent one end of the horizontal portion of the T-shaped transverse frame and with the countershaft journaled in said pivotally mounted standard adjacent the opposite end of the horizontal portion of the T-shaped transverse frame, the end of said countershaft adjacent said transverse frame being shiftable toward and away from said driven shaft in substantially the same horizontal plane.

7. A belt drive speed change mechanism as set forth in claim 5 in which said adjustable tension means comprises a coil spring connected with the lower extension of said pivotally mounted standard and engaged by a hook having a screw threaded shank thereon adjustable through a screw threaded member carried by one side of said longitudinally extending frame member for maintaining tension between said countershaft and said driven shaft for stretching the belt in frictional engagement with said pulleys.

8. A belt drive speed change device as set forth in claim 5 in which a reinforcing transversely disposed link is fastened to said transverse frame and extends between the lower portion of said first mentioned vertically extending standard and the pivot of said pivotally mounted standard for strengthening the assembly of said standards and said transverse frame.

9. A belt drive speed change device as set forth in claim 5 in which said first mentioned vertically extending standard is disposed within the limits of said longitudinally extending frame structure and wherein said pivotally mounted standard is located outside the limits of said longitudinally extending frame structure whereby said driven shaft and said countershaft are maintained in substantially parallel spaced longitudinal axes in substantially the same horizontal plane above the longitudinally extending frame structure where the axis of the driven shaft is within the limits of said longitudinally extending frame structure and the axis of said countershaft is outside the limits of said longitudinally extending frame structure.

10. A belt drive speed change device as set forth in claim 5 in which a transverse link is fastened intermediate its ends to said transverse frame and extends in an angularly downward direction and is secured at its lower end adjacent the lower end of said first mentioned vertically extending standard and projects in an angularly upward direction at its other end and is fastened at the pivot of said pivotally mounted standard for strengthening the assembly of said standards and said transverse frame.

RALPH S. HERTZLER.

References Cited in the file of this patent

UNITED STATES PATENTS

| Number | Name | Date |
| --- | --- | --- |
| 1,333,493 | Kilkenny | Mar. 9, 1920 |
| 1,761,286 | Zuckerman | June 3, 1930 |
| 2,015,549 | Dwyer | Sept. 24, 1935 |
| 2,071,325 | Bateman | Feb. 23, 1937 |
| 2,176,572 | Hedgpeth | Oct. 17, 1939 |
| 2,379,178 | Templeton | June 26, 1945 |

FOREIGN PATENTS

| Number | Country | Date |
| --- | --- | --- |
| 833,221 | France | Oct. 17, 1938 |